United States Patent
Asai

(10) Patent No.: US 8,810,817 B2
(45) Date of Patent: Aug. 19, 2014

(54) STORAGE MEDIUM IN WHICH INFORMATION PROCESSING PROGRAM IS STORED, INFORMATION PROCESSING APPARATUS, AND INFORMATION PROCESSING SYSTEM

(75) Inventor: Norihiko Asai, Tajimi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 97 days.

(21) Appl. No.: 13/429,409

(22) Filed: Mar. 25, 2012

(65) Prior Publication Data

US 2013/0083340 A1    Apr. 4, 2013

(30) Foreign Application Priority Data

Sep. 30, 2011    (JP) .................................. 2011-216309

(51) Int. Cl.
G06F 3/12    (2006.01)
G06K 15/00    (2006.01)

(52) U.S. Cl.
USPC .......................... 358/1.13; 358/1.15; 358/1.16

(58) Field of Classification Search
None
See application file for complete search history.

(56) References Cited

U.S. PATENT DOCUMENTS

2003/0231329 A1*    12/2003    Edmonds et al. ............ 358/1.13
2004/0156074 A1*    8/2004    Kim ............................. 358/1.15
2010/0146104 A1*    6/2010    Chen et al. .................... 709/224

FOREIGN PATENT DOCUMENTS

JP    H10-187373 A    7/1998
JP    2009-003586 A    1/2009
JP    2011-013849 A    1/2011

OTHER PUBLICATIONS

Machine translation in english of JP Pub 2009-003586 to Shimizu Masaru.*

* cited by examiner

*Primary Examiner* — Benny Q Tieu
*Assistant Examiner* — Haris Sabah
(74) *Attorney, Agent, or Firm* — Baker Botts L.L.P.

(57) ABSTRACT

An information processing program stored in a computer readable storage medium is usable for an information processing apparatus which is configured to communicate with a plurality of devices, which includes a first storage section, in which a driver and a plurality of pieces of port information are stored, and which instructs a control objective device, a port information of which is stored in the first storage section, to execute a function thereof. The program makes the apparatus execute steps including: a receiving step for receiving a status information from the control objective device; a first identifying step for identifying the control objective device; a second identifying step for identifying an alternative device operable by the driver for the control objective device; and a first storage step for storing a port information of the alternative device in the first storage section.

11 Claims, 14 Drawing Sheets

Fig. 3A

| PRINTER NAME | DRIVER NAME | IP ADDRESS | PORT NAME | DEFAULT PRINTER |
|---|---|---|---|---|
| Printer123 | FX printer123 | 10.163.20.43 | 10.163.20.43 | O |
| Printer345 | FX printer345 | 10.163.20.41 | dkoge | |
| Printer345 (COPY 1) | FX printer345 | 10.163.20.40 | jdlgkd | |
| MFP123 | GX-499siries | 10.163.20.44 | kdodg | |

| PRINTER NAME | IP ADDRESS | PORT NAME | MODEL NAME | NODE NAME |
|---|---|---|---|---|
| Printer123 | 10.163.20.43 | 10.163.20.43 | Printer123 | adddf |
| Printer345 | 10.163.20.41 | dkoge | Printer345 | dkoge |
| Printer345 (COPY 1) | 10.163.20.40 | jdlgkd | Printer345 | jdlgkd |
| MFP123 | 10.163.20.44 | kdodg | MFP123 | kdodg |

142c

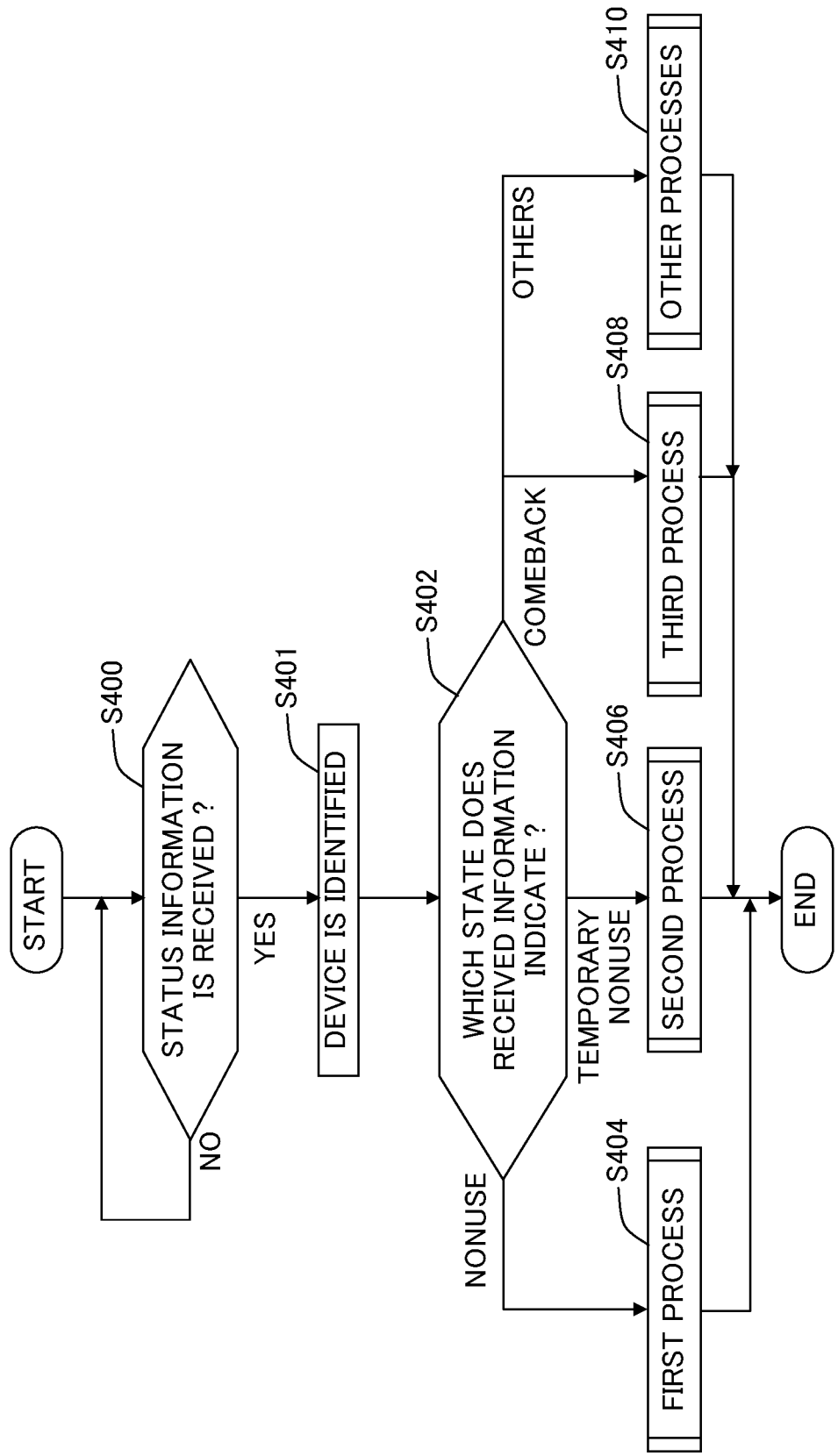

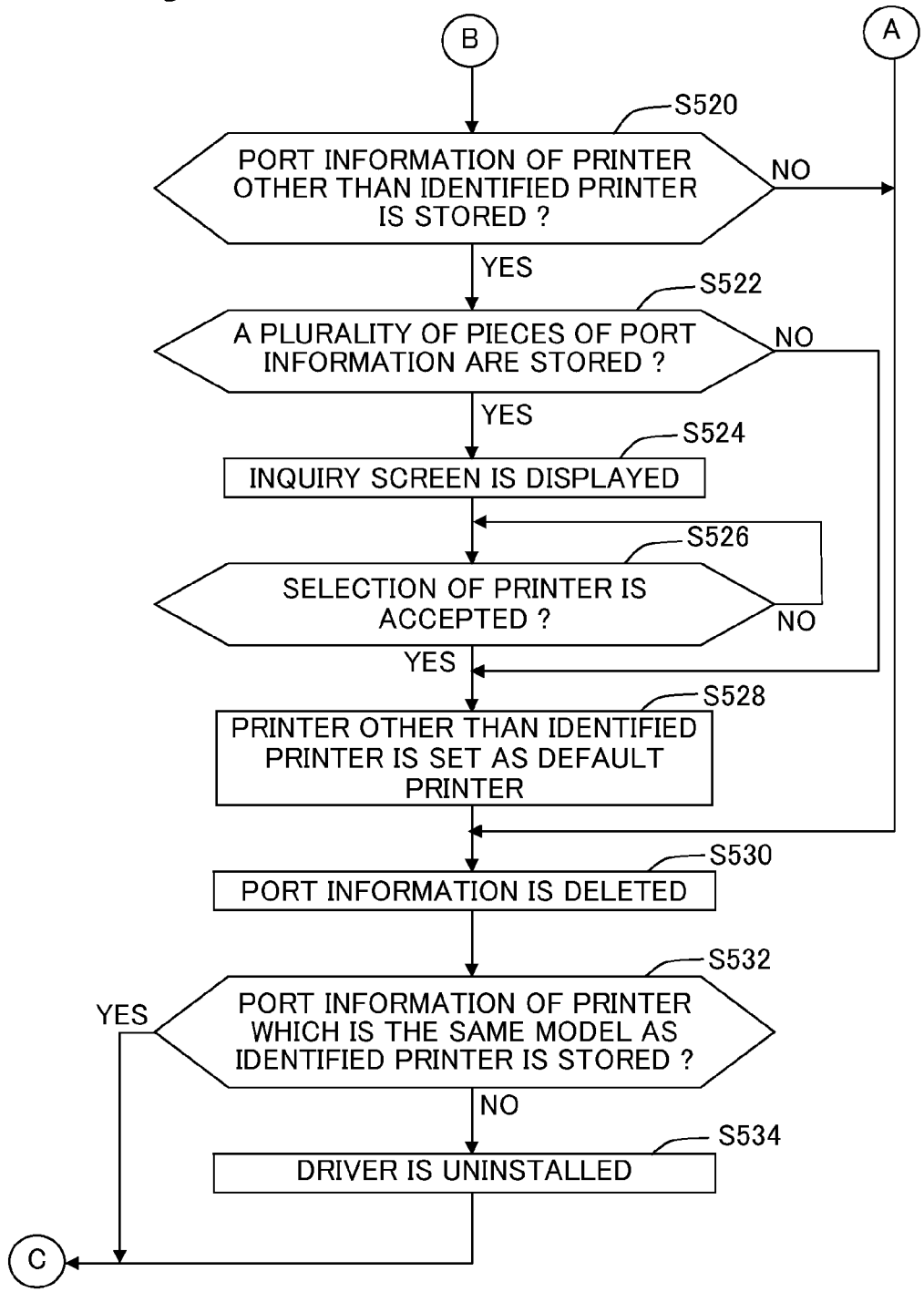

Fig. 12A

| PRINTER NAME | DRIVER NAME | IP ADDRESS | PORT NAME | DEFAULT PRINTER |
|---|---|---|---|---|
| Printer123 | FX printer123 | 10.163.20.43 | 10.163.20.43 | O |
| Printer345 | FX printer345 | – | USB001 | |
| Printer345 (COPY 1) | FX printer345 | 10.163.20.40 | jdlgkd | |
| MFP123 | GX-499siries | 10.163.20.44 | kdodg | |

| PRINTER NAME | IP ADDRESS | PORT NAME | MODEL NAME | NODE NAME |
|---|---|---|---|---|
| Printer123 | 10.163.20.43 | 10.163.20.43 | Printer123 | adddf |
| Printer345 | – | USB002 | Printer345 | – |
| Printer345 (COPY 1) | 10.163.20.40 | | Printer345 | elclkd |
| MFP123 | 10.163.20.44 | | MFP123 | kdodg |

142c

STORAGE MEDIUM IN WHICH INFORMATION PROCESSING PROGRAM IS STORED, INFORMATION PROCESSING APPARATUS, AND INFORMATION PROCESSING SYSTEM

CROSS REFERENCE TO RELATED APPLICATION

The present application claims priority from Japanese Patent Application No. 2011-216309, filed on Sep. 30, 2011, the disclosure of which is incorporated herein by reference in its entirety.

BACKGROUND OF THE INVENTION

1. Field of the Invention

The present invention relates to a storage medium in which an information processing program is stored, an information processing apparatus, and an information processing system.

2. Description of the Related Art

In recent years, it has become common that data is outputted to a printer, which is connected to a PC (personal computer), to execute printing. In order to print the data, which is outputted from the PC, by the printer, a driver corresponding to the printer is required to be installed on the PC in advance by the user.

Japanese Patent Application Laid-open No. 2011-13849 discloses a technique such that a driver of a printer connected to the network, to which a PC is connected, is automatically installed on the PC. Further, Japanese Patent Application Laid-open No. 2011-13849 discloses a technique such that a driver of a printer which is disconnected from the network, to which the PC is connected, is automatically uninstalled from the PC.

SUMMARY OF THE INVENTION

However, in the technique described in Japanese Patent Application Laid-open No. 2011-13849, for example, the following situation is not considered. That is, two or more printers corresponding to the same printer driver are connected to the network, and one of the printers is removed from the network due to disposal etc.

An object of the present teaching is to provide a technique as follows. That is, in an information processing apparatus such as a PC, in a case that a plurality of devices corresponding to one driver are connected to a network and that a device of the plurality of devices can not be used, another device, among the plurality of devices corresponding to said one driver, is allowed to be used, instead of the device which can not be used. Accordingly, User convenience is improved.

According to the first aspect of the present teaching, there is provided a non-transitory computer readable storage medium in which an information processing program is stored, the program being usable for an information processing apparatus which is configured to communicate with a plurality of devices, which includes a first storage section, in which a driver configured to operate the plurality of devices and a plurality of pieces of port information to communicate with the plurality of devices are stored, and which instructs a control objective device, among the plurality of devices, a piece of port information of which is stored in the first storage section, to execute a function of the control objective device, and the program making the information processing apparatus execute steps including: a receiving step in which a piece of status information is received from the control objective device; a first identifying step in which the control objective device is identified; a second identifying step in which an alternative device which is operated by the driver to operate the control objective device is identified from among the plurality of devices; and a first storage step in which, in a case that a type of the status information is nonuse of the control objective device, a piece of port information of the alternative device is stored in the first storage section.

The present teaching can be realized, other than the computer readable storage medium in which the information processing program is stored, in various aspects, such as the information processing apparatus or an information processing system provided with the information processing apparatus and the plurality of devices.

BRIEF DESCRIPTION OF THE DRAWINGS

FIG. 3A schematically shows a printer control table which is controlled by an OS according to the embodiment of the present teaching; FIG. 3B schematically shows a printer control table which is controlled by a printer application according to the embodiment of the present teaching.

FIG. 4 is a flowchart showing an entire process executed by the PC according to the embodiment of the present teaching.

FIGS. 5A and 5B show a flowchart showing the first process executed by the PC according to the embodiment of the present teaching.

FIG. 12A schematically shows a printer control table which is controlled by the OS according to a modified embodiment of the present teaching; FIG. 12B schematically shows a printer control table which is controlled by the printer application according to the modified embodiment of the present teaching.

DESCRIPTION OF THE PREFERRED EMBODIMENTS

[Structure of Embodiment]
<Structure of System>

Figure 1:
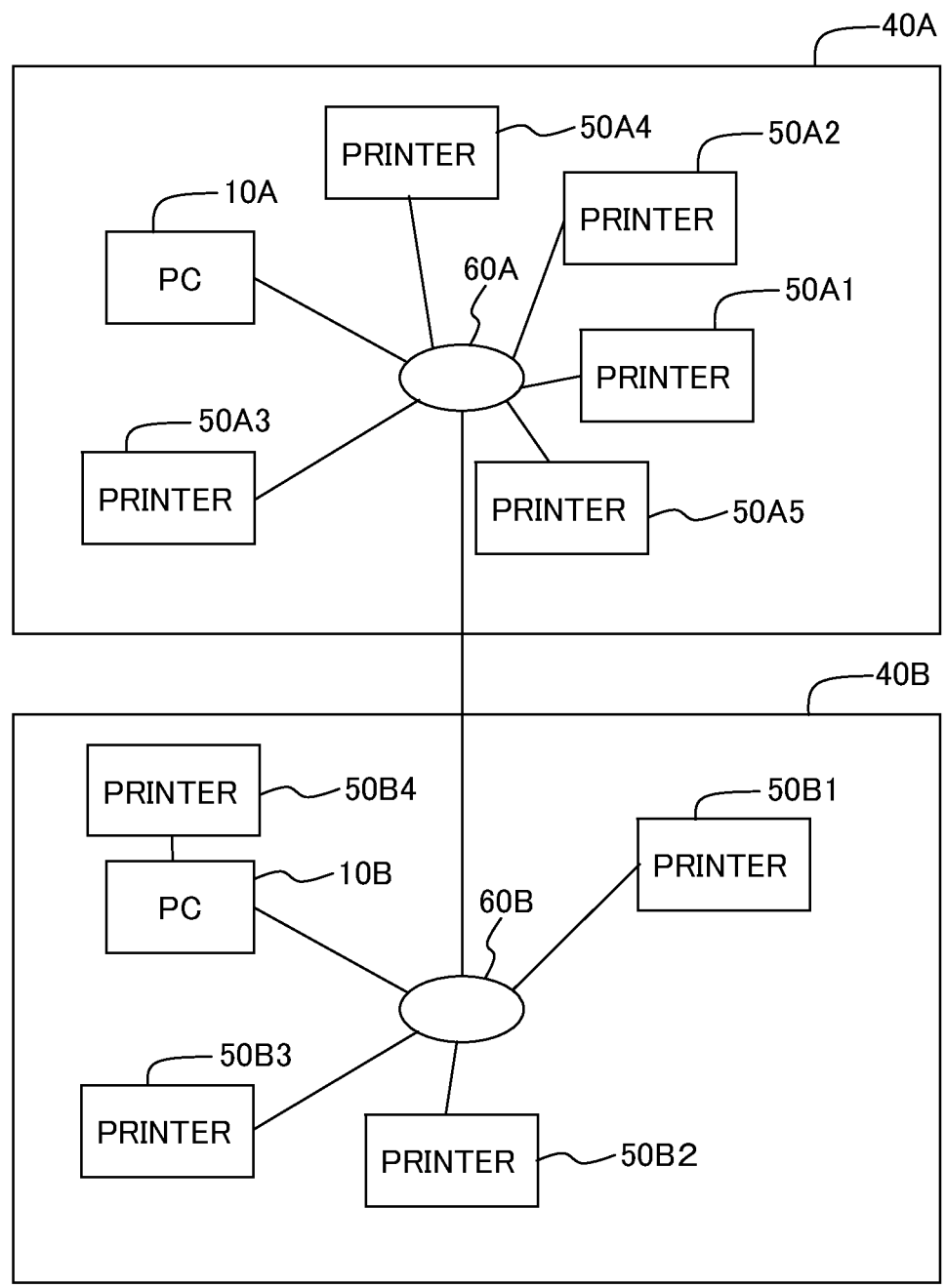
FIG. 1 is a system configuration diagram showing an example of an overall construction of a communication system according to an embodiment of the present teaching.

Hereinbelow, an explanation will be made with reference to the accompanying drawings about a communication system (an example of the information processing system according to an embodiment of the present teaching. As shown in FIG. 1, a PC 10A (an example of the information processing apparatus) and printers 50A1 to 50A5 (an example of a plurality of devices) which are present on a LAN (Local Area Network) 40A are connected to one another via a router 60A. In the PC 10A and the printers 50A1 to 50A5 which are connected to one another via the router 60A, it is possible to carry out message transmission and message reception in accordance with TCP/IP. Further, it is possible to carry out the massage transmission and massage reception between the PC 10A present on the LAN 40A and a PC 10B or printers 50B1 to 50B4 which is/are present on a LAN 40B, via the routers 60A and 60B. In the following description, in a case that each of the printers is required to be identified individually, the printer is referred to as the printer 50A1, the printer 50B1, etc. On the other hand, in a case that each of the printers is explained as any of the printers which are present on the LAN 40A or 40B, the printer is referred to simply as the printer 50A or 50B.

<Structure of PC 10A>

Figure 2A:
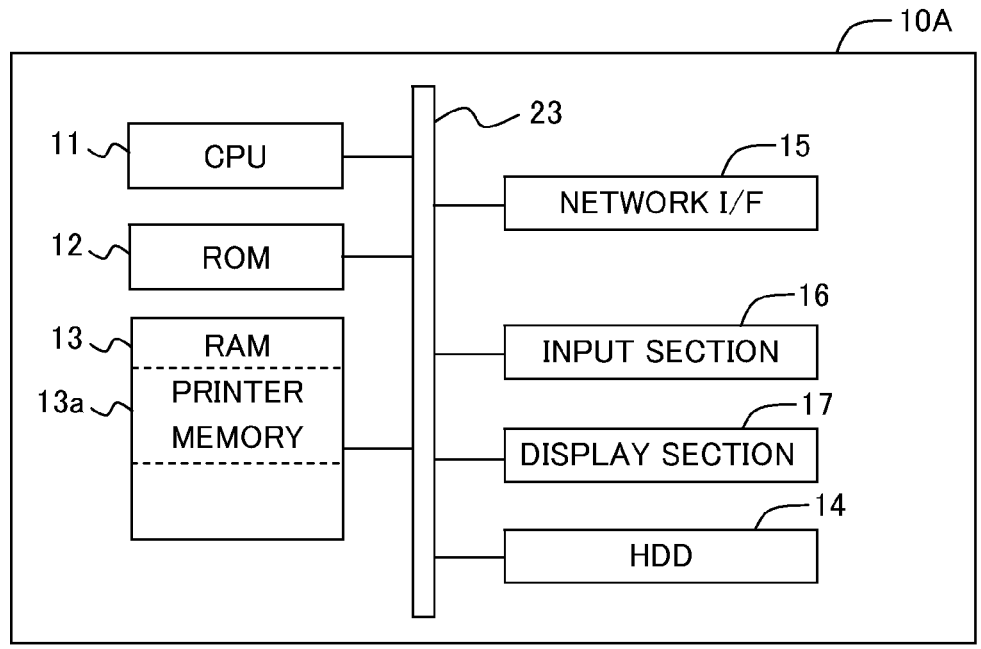
FIG. 2A is a block diagram showing an example of hardware construction of a PC according to an embodiment of the present teaching.

As shown in FIG. 2A, the PC 10A includes a CPU 11 (an example of a controller), a ROM 12, a RAM 13, a HDD 14 (an example of a storage section and an example of the first storage section), a network I/F 15 (an example of the communication unit), an input section 16, and a display section 17, These components are connected to one another via a bus line 23.

Figure 2B:
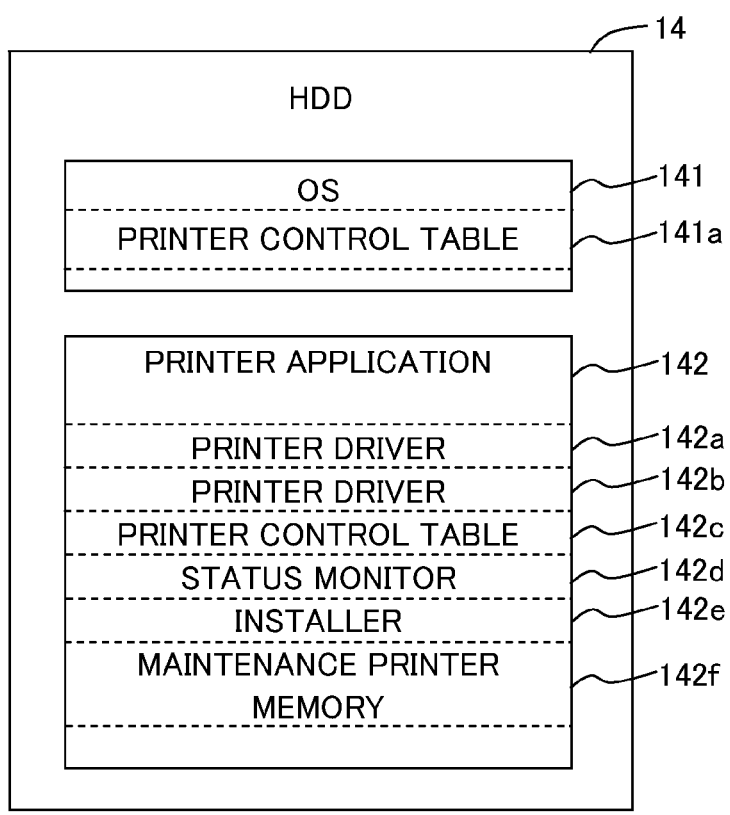
FIG. 2B schematically shows a storage content of a HDD according to the embodiment of the present teaching.

The CPU 11 executes a process in accordance with a program stored in the HDD 14 to provide an instruction to each hardware. The ROM 12 is a non-volatile memory which stores various fixed values required for the process of the CPU 11. The RAM 13 is a volatile memory which temporarily stores information required for the process of the CPU 11. Although details will be described later, the RAM 13 includes a printer memory 13a which temporarily stores an IP address (Internet Protocol Address) or a printer name of the printer from which various signals are transmitted. The HDD 14 is a writable non-volatile memory. As shown in FIG. 2B, the HDD 14 stores an OS (operating system) 141 and a printer application 142. A printer control table 141a stores information in relation to the printer(s) which can be used via the PC 10A. Details of the printer control table 141a will be described later.

The printer application 142 is a program which is distributed from the manufacturer of the printer 50A to the user of the printer 50A. The user installs the printer application 142 on the PC 10A before the use of the printer 50A via the PC 10A. Printer drivers 142a and 142b are printer drivers, which correspond to the printers of different models respectively. In FIG. 2B, although there are two printer drivers stored in the HDD 142, the number of printer drivers may be either larger than two or smaller than two.

The printer control table 142c stores information in relation to the printer(s) which can be used via the PC 10A. A status monitor 142d is an application program which provides an instruction to perform processes as shown in FIGS. 4 to 7. In addition to the processes shown in FIGS. 4 to 7, a process in which status received from the printer 50A is displayed on the display section 17 of the PC 10A is also included in the processes executed by the status monitor 142d. However, details thereof are omitted here.

An installer 142e is a program which is executed for making it possible to use a new printer 50A via the PC 10A. The printer driver of the new printer 50A is stored in the HDD 14 by the CPU 11 in accordance with the installer 142e. However, in a case that the printer driver of the printer, which is the same model as the new printer 50A, has already been stored in the HDD 14, the storage of the printer driver of the new printer is omitted. Then, information in relation to the new printer 50A is stored in the printer control tables 141a and 142c by the CPU 11.

A maintenance printer memory 142f (an example of the storage section and an example of the second storage section) stores a node name (an example of the inherent information) of the printer 50A which is now being maintained.

The network I/F 15 is a device to communicate the PC 10A with any other apparatus. An example of the network I/F 15 is a well-known network hardware. The input section 16 is configured to include a mouse, a keyboard, and the like. The display section 17 is, for example, a liquid crystal display and carries out the display in accordance with a signal inputted from the CPU 11.

<Printer Control Table 141a>

The printer control table 141a as shown in FIG. 3A stores setting values of the printer 50A for the printer name, a driver name, the IP address, a port name, and an item indicating presence or absence of a default printer flag. As described above, the setting values of the printer 50A for the respective items are stored in the printer control table 141a by the CPU 11 in accordance with the installer 142e.

In a case that the printer 50A and the PC 10A are connected via the router 60A, the node name or the IP address of the printer is usually stored as the port name. The default printer flag is the information which indicates whether or not the printer 50A is a printer which is preferentially selected when a printing instruction is made to the printer by the user through the PC 10A. In the printer control table 141a, one printer 50A is usually stored as the default printer.

Printer Control Table 142c>

The printer control table 142c as shown in FIG. 3B stores setting values of the printer 50A for setting items including the printer name, the IP address, the port name, a model name, and the node name. As described above, the setting values of the printer 50A for the respective items are stored in the printer control table 142c by the CPU 11 in accordance with the installer 142e.

Hereinbelow, a setting value group, which is stored in the printer control tables 141a and 142c for each of the printers, is referred to as port information.

[Operation of System]
<Operation of PC10>

Hereinbelow, an entire process will be explained with reference to FIG. 4. In the entire process, the PC 10A receives status information, which is information indicating a state of the printer 50A, from the printer 50A. The process performed by the PC varies depending on the state of the printer 50A indicated by the status information. When the user operates the user interface such as operation buttons of the printer 50A to input a specific instruction, the printer 50A broadcasts the status information. Further, even when the specific instruction is not inputted by the user, the printer 50A regularly broadcasts the status information indicating the state of the presence or absence of the error, such as paper-out condition, ink-exhaustion condition, etc., detected by a detector. When the entire process is started, in S400 (an example of the receiving step), the CPU 11 judges as to whether or not the status information is received from any of the printers 50A1 to 50A5 via the network I/F 15. The status information includes a command which indicates the status information. In S400, the CPU 11 can judge, based on the presence or absence of the command which indicates the status information, as to whether or not the status information is included in a received packet. In a case that the CPU 11 judges that the status information is received (S400: Yes), the CPU 11 executes the process of S401. On the other hand, in a case that the CPU 11 judges that the status information is not received (S400: No), the CPU 11 executes the process of S400.

In S401 (an example of the first identifying step), the CPU 11 identifies the printer 50A, from which the status information was transmitted, based on the IP address of the printer 50A from which the status information was transmitted. The IP address is included in the packet transmitted from the printer 50A. Then, the IP address of the identified printer 50A is stored in the printer memory 13a, and the CPU 11 executes the process of S402.

In S402 (an example of the third identifying step), the CPU 11 judges the type of the status information based on ID included, in the status information. In particular, the type of the information is judged based on an inherent ID which is described in the packet body of the status information. In a case that the CPU 11 judges that the status information indicates nonuse of the device (S402: nonuse of device), the CPU 11 executes the process of S404. In a case that the CPU 11 judges that the status information indicates temporary nonuse of the device (S402: temporary nonuse of device), the CPU 11 executes the process of S406. In a case that the CPU 11 judges that the status information indicates a comeback of the device (S402: comeback of device), the CPU 11 executes the process of S408. In a case that the CPU 11 judges that the status information indicates any other case (S402: other processes), the CPU 11 executes the process of S410.

It is noted that the "nonuse" refers to the situation such that the printer is removed from the network due to disposal etc., and said printer is less likely to come back to the network. The "temporary nonuse" refers to the situation such that, although the printer is temporarily removed from the network due to the maintenance etc., said printer is more likely to come back to the network. The "comeback" refers to the situation such that the printer in the temporary nonuse state is reconnected to the network after completion of the maintenance etc.

The first process of S404, the second process of S406, and the third process of S408 are subroutines. Details of the subroutines will be described later with reference to FIGS. 5 to 7. Other processes of S410 include, for example, a process in which the display of paper-out is executed on the display section 17 by the CPU 11. Detailed explanation therefor will be omitted here.

<First Process>

The first process will be explained with reference to FIG. 5. The first process is a process which is performed in a case that the CPU 11 judges in S402 that the received status information indicates the "nonuse". In S500 (an example of the first judgment step), the CPU 11 judges as to whether or not the printer (hereinafter referred to as an identified printer), the IP address of which is stored in the printer memory 13a, is the default printer. In particular, the CPU 11 judges as to whether or not the default printer flag of the identified printer is on in the printer control table 141a. In a case that the CPU 11 judges that the identified printer is the default printer (S500: Yes), the CPU 11 executes the process of S502. On the other hand, in a case that the CPU 11 judges that the identified printer is not the default printer (S500: No), the CPU 11 executes the process of S530.

In S502 (an example of the second identifying step), the CPU 11 judges as to whether or not the port information of the printer 50A, which is the same model as the identified printer, is stored in the PC 10A. In particular, the following process is performed. That is, the CPU 11 refers to the printer control table 142c to read the model name of the identified printer. Then, the CPU 11 judges as to whether or not the port information of the printer 50A, which is other than the identified printer and has the model name read on the printer control table 142c, is stored in the printer control table 142c.

In S502, in a case that the CPU 11 judges that the port information of the printer 50A, which is the same model as the identified printer, is stored in the PC 10A (S502: Yes), the CPU 11 executes the process of S508. On the other hand, in a case that the CPU 11 judges that the port information of the printer 50A, which is the same model as the identified printer, is not stored in the PC 10A (S502: No), the CPU 11 executes the process of S504.

In S504, in a ease that the port information of the printer 50A, which is the same model as the identified printer, is not stored in the PC 10A, the CPU 11 searches the printer, which is the same model as the identified printer, from among the printers connected to the network. That is, the CPU 11 controls the network I/F 15 to broadcast a request message to request a reply from the printer which is the same model as the identified printer. Then, the CPU 11 executes the process of S506.

In S506 (an example of the second identifying step and an example of the fourth judgment step), the CPU 11 judges as to whether or not the search of the printer, which is the same model as the identified printer, is successful. That is, after the request message is broadcasted by the network I/F 15 in S504, the CPU 11 waits for a predetermined time to judge as to whether or not the reply from the printer, which is the same model as the identified printer, is received during the predetermined time. In a case that the CPU 11 judges that the reply is received (S506: Yes), the CPU 11 executes the process of S508. On the other hand, in a case that the CPU 11 judges that the reply is not received (S506: No), the CPU 11 executes the process of S520.

Figure 8A:
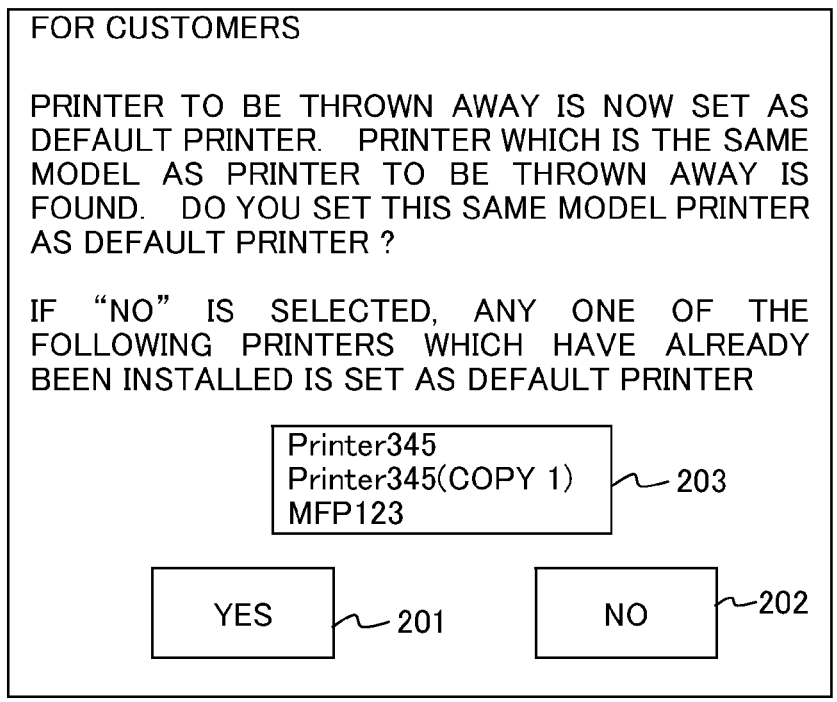
FIGS. 8A to 8C show examples of inquiry screens displayed on a display section of the PC according to the embodiment of the present teaching.

In S508, the CPU 11 displays an inquiry screen as shown in FIG. 8A on the display section 17. FIG. 8A shows a display which inquires of the user whether or not the printer, which is the same model as the identified printer, is set as the default printer. In a case that the user desires to set the printer, which is the same model as the identified printer, as the default printer, an icon 201 indicating "YES" is selected. In a case that the user does not desire to set the printer, which is the same model as the identified printer, as the default printer, an icon 202 indicating "NO" is selected. Further, the inquiry screen also includes a printer name display section 203 on which it is displayed the printer name(s) of the printer(s) 50A, the port information (a plurality of pieces of port information) of which is stored in the printer control tables 141a and 142c. Then, the CPU 11 executes the process of S510.

In S510, the CPU 11 judges as to whether or not the instruction to set the printer, which is the same model as the identified printer, as the default printer is made. More specifically, the CPU 11 judges which one of the signal corresponding to an area on which the icon 201 indicating "YES" is displayed and the signal corresponding to an area on which the icon 202 indicating "NO" is displayed is inputted from the input section 16. In a case that the CPU 11 judges that the signal corresponding to the area on which the icon 201 indicating "YES" is displayed is inputted (S510: Yes), the CPU 11 executes the process of S512. On the other hand, in a case that the CPU 11 judges that the signal corresponding to the area on which the icon 202 indicating "NO" is displayed is inputted (S510: No), the CPU 11 executes the process of S520.

In S512 (an example of the fifth judgment step), the CPU 11 judges, in a similar manner to that of S502, as to whether or not the port information of the printer 50A, which is the same model as the identified printer, is stored in the PC 10A. In a case that the CPU 11 judges that the port information of the printer 50A, which is the same model as the identified printer, is not stored in the PC 10A (S512: No), the CPU 11 executes the process of S514. On the other hand, in a case that the CPU 11 judges that the port information of the printer 50A, which is the same model as the identified printer, is stored in the PC 10A (S512: Yes), the CPU 11 executes the process of S516.

In S514 (an example of the first storage step), the port information of the printer searched in S506 is newly stored by the CPU 11. In particular, the following process is performed. That is, the printer name, the driver name, the IP address, and the port name of the printer searched in S506 are stored in the printer control table 141a by the CPU 11. Further, the printer name, the IP address, the port name, the model name, and the node name of the printer searched in S506 are stored in the printer control table 142c by the CPU 11. Then, the CPU 11 executes the process of S516.

In S516 (an example of the deletion step), the CPU 11 deletes the port information of the identified printer. In particular, the following process is performed. That is, the CPU 11 deletes the port information of the identified printer from the printer control tables 141a and 142c. Then, the CPU 11 executes the process of S518.

In S518 (an example of the first setting step), the CPU 11 sets the printer, which is the same model as the identified printer, as the default printer. More specifically, in the printer control table 141a, the default printer flag of the printer 50A, the port information of which is stored in S514, is turned on by the CPU 11. Then, the CPU 11 completes the first process and the process returns to the entire process as shown in FIG. 4.

In S520, since the printer which is the same model as the identified printer was not searched on the network (S506: No) or since the instruction to set the printer which is the same model as the identified printer as the default printer was not made (S510: No), the CPU 11 judges as to whether or not the port information of the printer 50A, which is other than the identified printer, is stored in the PC 10A. More specifically, the CPU 11 judges as to whether or not the port information of the printer 50A, which is other than the identified printer, is stored in the printer control tables 141a and 142c, In a case that the CPU 11 judges that the port information of the printer 50A, which is other than the identified printer, is stored in the PC 10A (S520: Yes), the CPU 11 executes the process of S522. On the other hand, in a case that the CPU 11 judges that the port information of the printer 50A, which is other than the identified printer, is not stored in the PC 10A (S520: No), the CPU 11 executes the process of S530.

In S522, the CPU 11 judges as to whether or not the plurality of pieces of port information of the plurality of printers, other than the identified printer, are stored in the PC 10A, that is, as to whether or not the plurality of pieces of port information of the plurality of printers are stored in the printer control tables 141a and 142c. In a case that the CPU 11 judges that the plurality of pieces of port information of the plurality of printers are stored (S522: Yes), the CPU 11 executes the process of S524. In a case that the CPU 11 judges that the port information of only one printer is stored (S522: No), the CPU 11 executes the process of S528.

Figure 8B:
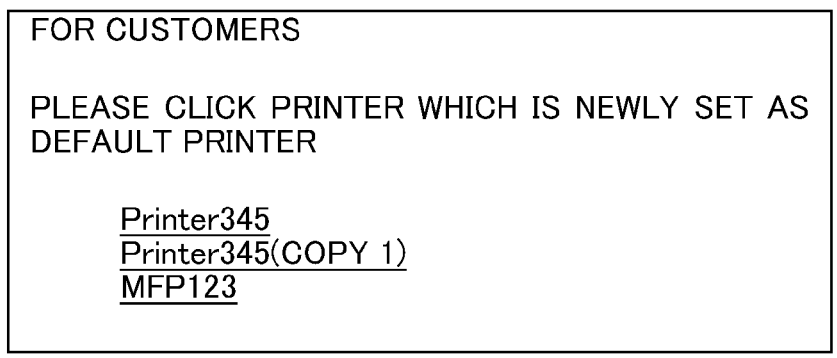

In S524 (an example of the instruction acceptance step), the inquiry screen is displayed on the display section 17 by the CPU 11, the inquiry screen being a screen which inquires of the user as to which one of the printers 50A, other than the identified printer, the plurality of pieces of port information of which are stored in the PC 10A, is set as the default printer. An example of the inquiry screen is shown in FIG. 8B. Then, the CPU 11 executes the process of S526.

In S526 (an example of the instruction acceptance step), the CPU 11 judges as to whether or not selection of the printer is accepted on the inquiry screen displayed in S524. In a case that the CPU 11 judges that the selection of the printer is accepted (S526: Yes), the CPU 11 executes the process of S528. On the other hand, in a case that the CPU 11 judges that the selection of the printer is not accepted (S526: No), the CPU 11 waits until the CPU 11 judges that the selection of the printer is accepted.

In S528 (an example of the fourth setting step), the printer which is judged in S526 that the selection of the printer is accepted or the only printer, the port information of which is stored in the PC 10A, is set as the default printer by the CPU 11. That is, in the printer control table 141a, the default print flag of the printer, which is judged in S526 that the selection of the printer is accepted, or the default print flag of the only printer, the port information of which is stored in the PC 10A, is turned on by the CPU 11. Then, the CPU 11 executes the process of S530.

In S530, the CPU 11 deletes the port information of the identified printer in a similar manner to that of S516, and the CPU 11 executes the process of S532.

In S532, the CPU 11 judges as to whether or not the port information of the printer, which is the same model as the identified printer, is stored in the PC 10A in a similar manner to that of S502. In a case that the CPU 11 judges that the port information of the printer, which is the same model as the identified printer, is not stored in the PC 10A (S532: No), the CPU 11 executes the process of S534. On the other hand, in a case that the CPU 11 judges that the port information of the printer, which is the same model as the identified printer, is stored in the PC 10A (S532: Yes), the first process is completed and the process returns to the entire process as shown in FIG. 4.

In S534, the CPU 11 uninstalls the printer driver of the identified printer from the PC 10A. Then, the first process is completed and the process returns to the entire process as shown in FIG. 4.

<Second Process>

The second process will be explained with reference to FIG. 6. The second process is a process which is performed in a case that the CPU 11 judges in S402 that the received status information indicates the "temporary nonuse". The second process is different from the first process in that the process of S600 is added to the first process and that the processes of S516, S530, S532, and S534 in the first process are not performed. In the second process, the processes of S500, S514, and S518 correspond to the "second judgment step", the "second storage step", and the "second setting step" according to the present teaching. In the second process, the processes other than the processes described above are same as those of the first process. Thus, the processes, which are the same as or equivalent to those of the first process, are denoted by the same reference numerals and symbols, and explanation thereof will be omitted. In S600 (an example of the third storage step), in a case that the CPU 11 judges in S500 that the identified printer is the default printer (S500: Yes), the node name (an example of the inherent information) of the identified printer is stored in the maintenance printer memory 142f. That is, the node name of the identified printer which was previously set as the default printer is stored in the maintenance printer memory 142f. Then, the CPU 11 executes the process of S502.

<Third Process>

Figure 7:
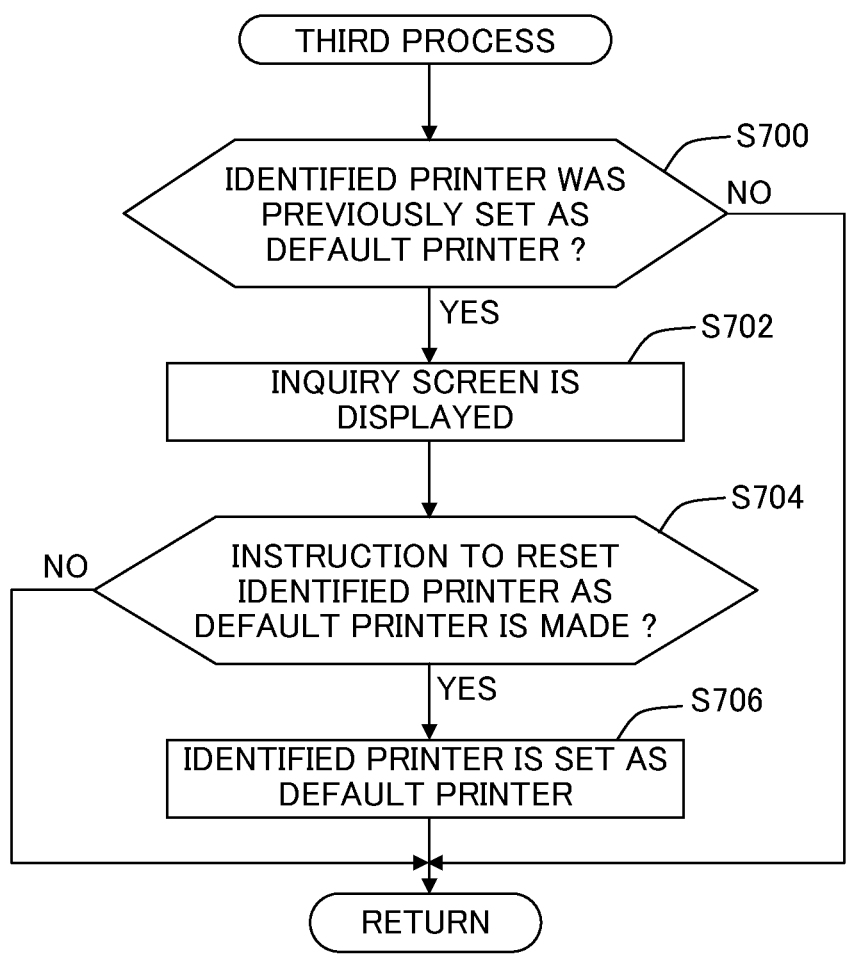
FIG. 7 is a flowchart showing the third process executed by the PC according to the embodiment of the present teaching.

The third process will be explained with reference to FIG. 7. The third process is a process which is performed in a case that the CPU 11 judges in S402 that the received status information indicates the "comeback". In S700 (an example of the third judgment step), the CPU 11 judges as to whether or not the identified printer is a printer which was previously set as the default printer and was removed from the network due to the maintenance. In particular, the CPU 11 judges, by reference to the printer control tables 141a and 142c, as to whether or not the identified printer is the same as the printer in which the node name is stored in the maintenance printer memory 142f. In a case that the CPU 11 judges that the identified printer is the printer which was previously set as the default printer and was removed from the network due to the maintenance (S700: Yes), the CPU 11 executes the process of S702. On the other hand, in a case that the CPU 11 judges that the identified printer is not the printer which was removed from the network due to the maintenance (S700: No), the third process is completed and the process returns to the entire process as shown in FIG. 5.

Figure 8C:
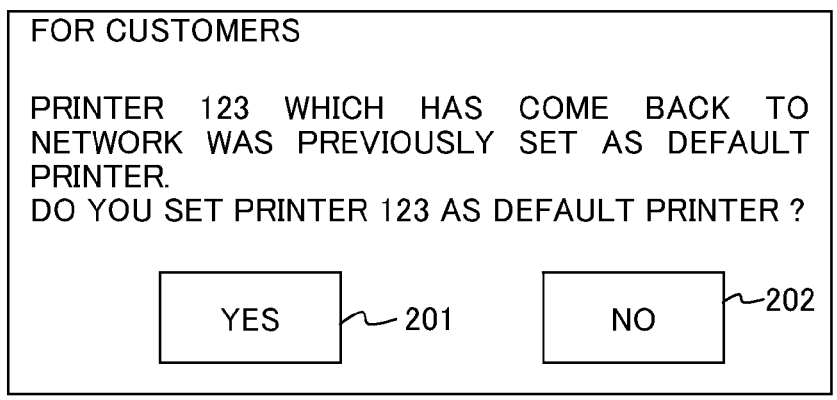

In S702, the inquiry screen, which inquires of the user whether or not the identified printer is reset as the default printer, is displayed on the display section 17 by the CPU 11. An example of the inquiry screen is shown in FIG. 8C. Similar to the inquiry screen shown in FIG. 8A, the icon 201 indicating "YES" and the icon 202 indicating "NO" are displayed on the inquiry screen shown in FIG. 8C. Then, the CPU 11 executes the process of S704.

In S704, the CPU 11 judges as to whether or not the instruction to reset the identified printer as the default printer is made. More specifically, the CPU 11 judges which one of the signal corresponding to the area on which the icon 201 indicating "YES" is displayed and the signal corresponding to the area on which the icon 202 indicating "NO" is displayed is inputted from the input section 16. In a case that the CPU 11 judges that the signal corresponding to the area on which the icon 201 indicating "YES" is displayed is inputted (S704: Yes), the CPU 11 executes the process of S706. On the other hand, in a case that the CPU 11 judges that the signal corresponding to the area on which the icon 202 indicating "NO" is displayed is inputted (S704: No), the third process is completed and the process returns to the entire process as shown in FIG. 5.

In S706 (an example of the third setting step), the identified printer is set as the default printer by the CPU 11. That is, in the printer control table 141a, the default printer flag which is now in the "on" state is turned off and the default flag of the identified printer is turned on by the CPU 11. Then, the CPU 11 completes the third process and the process returns to the entire process as shown in FIG. 5.

<Entire Operation>

EXAMPLE 1

Figure 9:
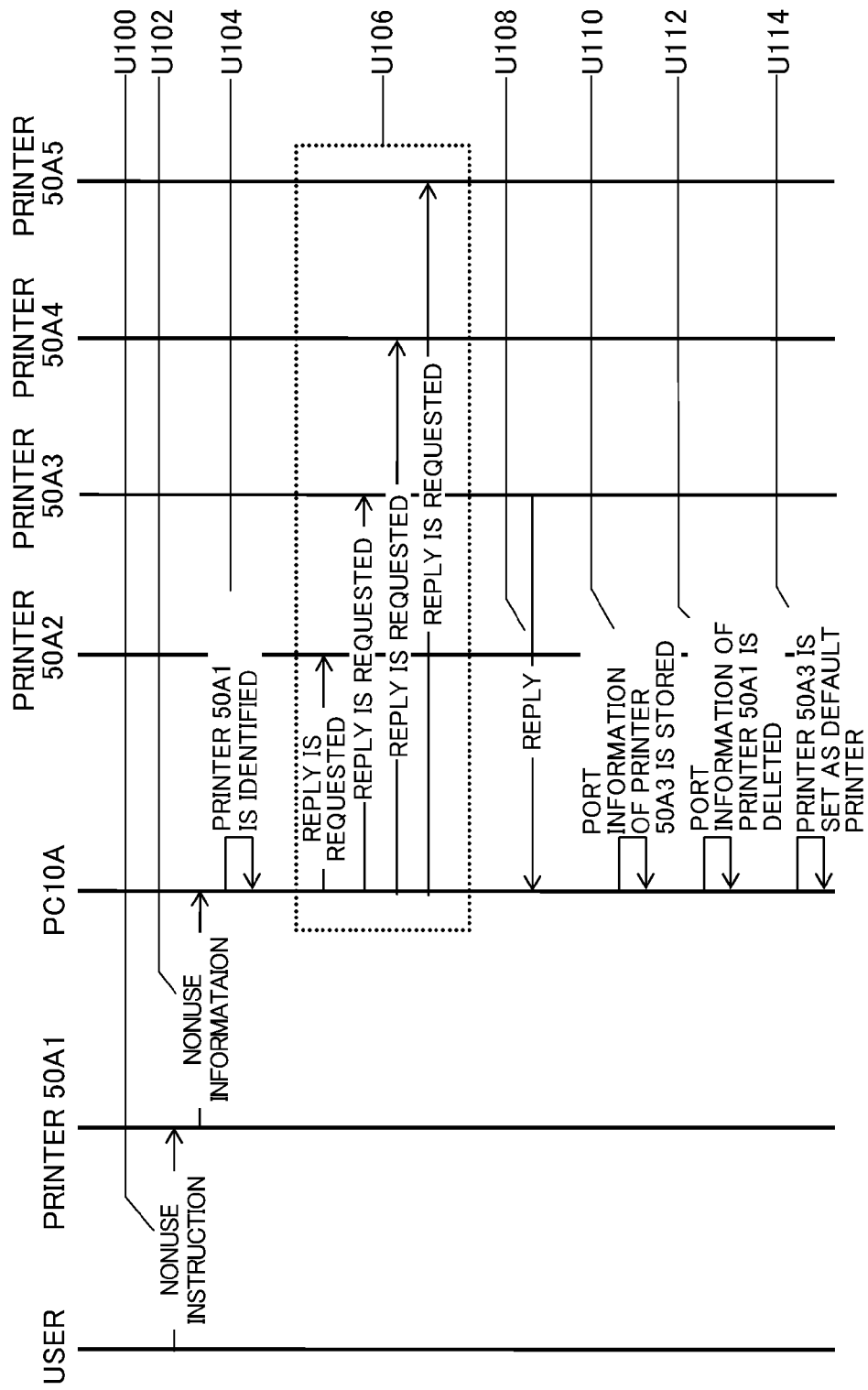
FIG. 9 is a sequence diagram showing an example of operations of a user, a printer, and the PC in a case that nonuse information is broadcasted from the printer according to the embodiment of the present teaching.

An explanation will be made with reference to FIG. 9 about operations of the user, the printer 50A, and the PC 10A, in a case that the port information of the printer which is the same model as the identified printer is not stored in the PC 10A (S502: No), that the printer which is the same model as the identified printer is connected to the network (S506: Yes), and that the instruction to set the printer which is the same model as the identified printer as the default printer is made (S510: Yes), in the first process shown in FIG. 5.

It is assumed that the PC 10A is connected to the LAN 40A shown in FIG. 1. The port information of each printer 50A stored in the PC 10A is given in the printer control table 141a in FIG. 3A and the printer control table 142c in FIG. 3B. The printer names of the printers 50A1, 50A2, 50A4, and 50A5 shown in FIG. 1 are Printer 123, Printer 345, Printer 345 (copy 1), and MFP 123 which are stored in the printer control tables 141a and 142c in FIGS. 3A and 3B, respectively. Further, the printer 50A3 is the same model as the printer 50A1. The port information of the printer 50A3 is not stored in the PC 10A. That is, each of the printers 50A1, 50A2, 50A4, and 50A5 corresponds to the "control objective device" of the present teaching, but the printer 50A3 does not correspond to the "control objective device" of the present teaching.

The user operates the user interface, such as the operation buttons of the printer 50A1, to input, to the printer 50A1, nonuse instruction which indicates the disposal of the printer 50A1 (U100). Then, the printer 50A1 broadcasts nonuse information from an unillustrated transmission section (U102). That is, in Example 1, the printer 50A1 corresponds to the "first control objective device" of the present teaching. The PC 10A which received the nonuse information from the printer 50A1 identifies the printer 50A1 (U104). Then, the message for requesting the reply of the printer, which is the same model as the printer 50A1, is broadcasted in the LAN 40A to which the PC 10A is connected (U106). The models of the printers 50A2, 50A4, and 50A5 are different from that of the printer 50A1. Thus, the printers 50A2, 50A4, and 50A5 do not reply to the PC 10A. On the other hand, the printer 50A3 is the same model as the printer 50A1. Thus, the printer 50A3 replies to the PC 10A (U108). That is, in Example 1, the printer 50A3 corresponds to an "alternative device" of the present teaching. The PC 10A stores the port information of the printer 50A3 which replied to the PC 10A (U110) and deletes the port information of the printer 50A1 which is removed from the LAN 40A due to the nonuse (U112). Then, the PC 10A sets the printer 50A3 as the default printer (U114).

EXAMPLE 2

Figure 10:
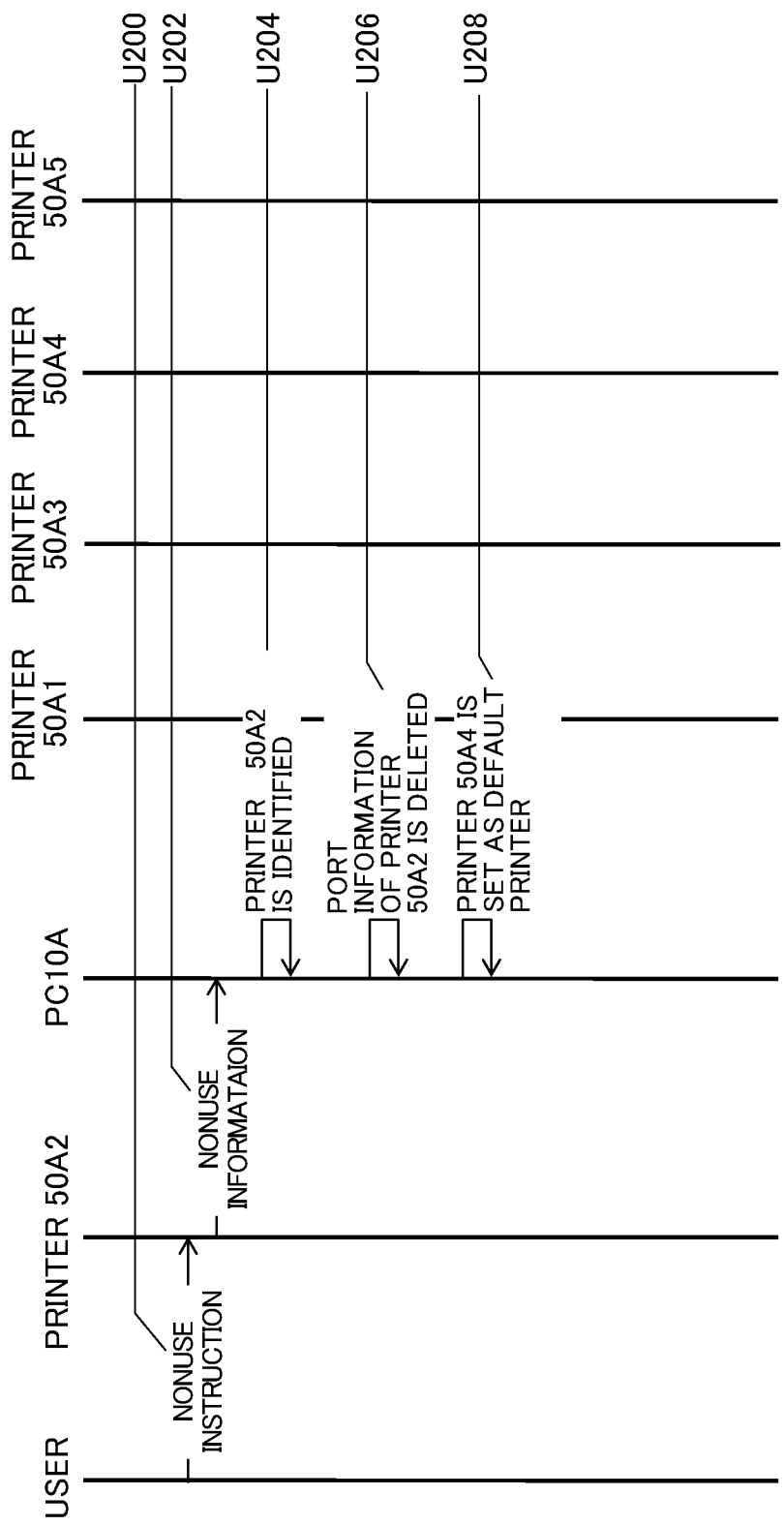
FIG. 10 is a sequence diagram showing another example of the operations of the user, the printer, and the PC in the case that the nonuse information is broadcasted from the printer according to the embodiment of the present teaching.

An explanation will be made with reference to FIG. 10 about the operations of the user, the printer 50A, and the PC 10A, in a case that the port information of the printer which is the same model as the identified printer is stored in the PC 10A (S502: Yes) and that the instruction to set the printer which is the same model as the identified. printer as the default printer is made (S510: Yes), in the first process shown in FIG. 5.

It is assumed that the PC 10A is connected to the LAN 40A as shown in FIG. 1. Each printer 50A, the port information of which is stored in the PC 10A, has each printer name shown in the printer control table 141a of FIG. 3A and the printer control table 142c of FIG. 3B. The printer names of the printers 50A1, 50A2, 50A4, and 50A5 are Printer 123, Printer 345, Printer 345 (copy 1), and MFP 123, respectively. However, it is assume that, in the printer control table 141a, the printer in which the default printer flag is turned on is the printer 50A2, the printer name of which is Printer 345.

The user operates the user interface, such as the operation buttons of the printer 50A2, to input, to the printer 50A2, the nonuse instruction which indicates the disposal of the printer 50A2 (U200). Then, the printer 50A2 broadcasts the nonuse information from the unillustrated transmission section (U202). That is, in Example 2, the printer 50A2 corresponds to the "first control objective device" of the present teaching. The PC 10A which received the nonuse information from the printer 50A2 identifies the printer 50A2 (U204). The PC 10A deletes the port information of the printer 50A2 (U206). The PC 10A sets the printer 50A4, which is the same model as the printer 50A2, as the default printer (U208). That is, in Example 2, the primer 50A4 corresponds to the "alternative device" of the present teaching.

EXAMPLE 3

Figure 11:
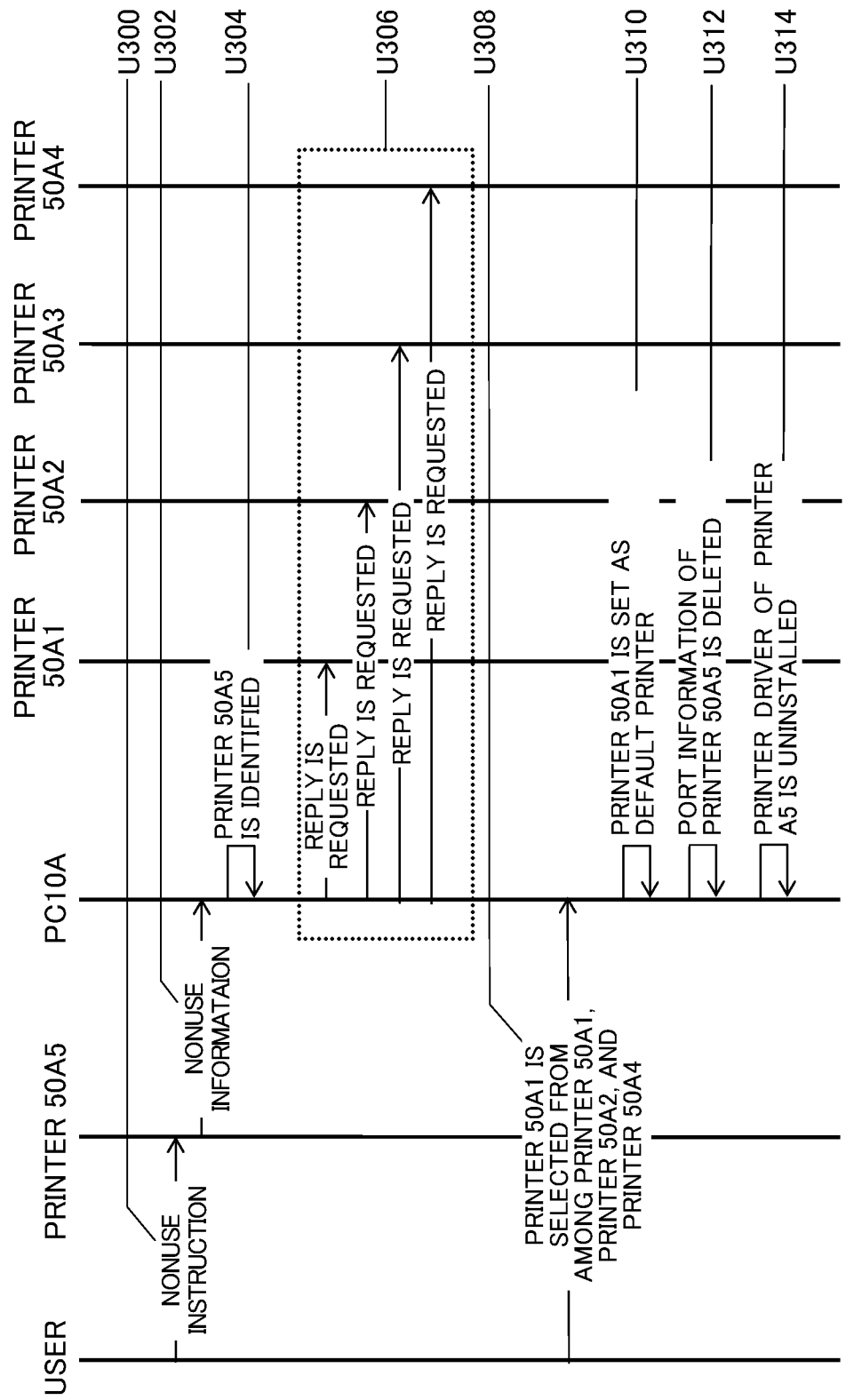
FIG. 11 is a sequence diagram showing still another example of the operations of the user, the printer, and the PC in the case that the nonuse information is broadcasted from the printer according to the embodiment of the present teaching.

An explanation will be made with reference to FIG. 11 about the operations of the user, the printer 50A, and the PC 10A, in a case that the port information of the printer which is the same model as the identified printer is not stored in the PC 10A (S502: No) and that the printer which is the same model as the identified printer is not connected to the network (S506: No), in the first process shown in FIG. 5.

It is assumed that the PC 10A is connected to the LAN 40A as shown in FIG. 1. Each printer 50A, the port information of which is stored in the PC 10A, has each printer name shown in the printer control table 141a of FIG. 3A and the printer control table 142c of FIG. 3B. The printer names of the printers 50A1, 50A2, 50A4, and 50A5 are Printer 123, Printer 345, Printer 345 (copy 1), and MFP 123, respectively. However, it is assume that, in the printer control table 141a, the printer in which the default printer flag is turned on is the printer 50A5, the printer name of which is MFP123.

The user operates the user interface, such as the operation buttons of the printer 50A5, to input, to the printer 50A5, the nonuse instruction which indicates that the printer 50A5 is removed, from the network (U300). Then, the printer 50A5 broadcasts the nonuse information from the unillustrated transmission section (U302). That is, in Example 3, the printer 50A5 corresponds to the "first control objective device" of the present teaching. The PC 10A which received the nonuse information from the printer 50A5 identifies the printer 50A5 (U304). Then, the message for requesting the reply of the printer, which is the same model as the printer 50A5, is broadcasted in the LAN 40A to which the PC 10A is connected (U306). The models of the printers 50A1, 50A2, 50A3, and 50A4 are different from that of the printer 50A5. Thus, the printers 50A1, 50A2, 50A3, and 50A4 do not reply to the PC 10A. The user selects any one of the printers 50A1, 50A2, and 50A4 to input the selection to the PC 10A (U308). Here, it is assumed that the printer 50A1 is selected. That is, in Example 3, the printer 50A1 corresponds to the "second control objective device" of the present teaching. The PC 10A sets the printer 50A1 as the default printer (U310). The PC 10A deletes the port information of the printer 50A5 (U312). Then, the PC 10A uninstalls the printer driver of the printer 50A5 (U314).

As described above, in a case that the PC 10A judges that the information received from the default printer indicates the "nonuse" state or the "temporary nonuse" state, the PC 10A identifies the printer, which is the same model as the printer in the nonuse state or the temporary nonuse state, to store the port information of the identified printer. Therefore, even when the default printer is removed from the network, the user can continue to use the printer which is the same model as the printer removed from the network. That is, any inconvenience is less likely to be generated on the user's work in relation to the use of the printer.

Further, in a case that the printer, which is the same model as the printer in the nonuse state or the temporary nonuse state, is not connected to the network, a printer, a piece of port information of which is newly stored in the PC 10A, is newly set as the default printer. Thus, it is possible to improve convenience of the user's work in relation to the use of the printer.

In the case that the PC 10A judges that the information received from the default printer indicates the nonuse state, the port information of the printer in the nonuse state is deleted from the PC 10A. Accordingly, it is possible to prevent the port information of the printer which was already removed from the network from continuing to be stored in the PC 10A.

In a case that the PC 10A judges that the information received from the printer 50A indicates the "comeback" state, the PC 10A judges as to whether or not the printer 50A was previously set as the default printer. Then, in a case that it is judged that the printer 50A was previously set as the default printer, the printer 50A is stored as the default printer. Accordingly, in a case that the printer 50A, which was previously used as the default printer in the PC 10A, comes back to the network 40A, it is possible to again use the printer 50A as the default printer smoothly.

[Modified Embodiments]
<Modified Embodiment in a Case that Status Information is Received from a Server>

In the above embodiments, the printer 50A broadcasts the status information, However, the following configuration is allowable. That is, for example, an unillustrated control server, a PC 10A1, and a PC 10A2 are connected to the network 40A. The control server accepts, from the PC 10A1, an information that the printer 50A becomes the nonuse state, that the printer 50A becomes the temporary nonuse state, or that the printer 50A comes back from the temporary nonuse state. Then, the information accepted from the PC 10A1 is transmitted to the PC 10A2. According to this configuration, the user is capable of controlling the printer 50A without unnecessarily moving to a place at which the printer 50A is disposed.

<Modified Embodiment in a Case that PC 10A Requests Status Information to Printer 50A>

In the above embodiments, the printer 50A broadcasts the status information. However, the following configuration is allowable. That is, the status information is transmitted from the printer 50A to the PC 10A depending on a reply request from the PC 10A.

<Modified Embodiment in a Case a USB Connection is made Between PC 10A and Printer 50A>

The printer 50A may be directly connected to the PC10A via a USB connection cable, like the connection between the printer 50B4 and the PC 10B as shown in FIG. 1. In a case that the printer 50B4 is connected to the PC 10B via the USB connection cable, the port information stored in the printer control tables 141a and 142c is partially different from those of the printers 50B1, 50B2, and 50B3 which are connected to the PC 10B via a router 60B. Respective examples of the printer control tables 141a and 142c, in which the port information of the printer 50B4 connected to the PC 10B via the USB connection cable and the plurality of the port information of the printers 50B1, 50B2, and 50B3 connected to the printer 10B via the router 60B are stored, are shown in FIGS. 12A and 12B. As shown in FIGS. 12A and 12B, in the printer 50B4 which is connected to the PC 10B via the USB connection cable, columns of the setting values of the IP address and the node name are blanks. Further, a logical port name of the USB is stored in the port name. That is, in a case that the present teaching is applied to the embodiment in which the identified printer is connected to the PC via the USB connection cable, like the printer 50B4, the port information includes the setting values as described above.

In a case that the identified printer is the printer 50B4 which is connected to the PC 10B via the USB connection cable, the printer name is stored in the printer memory 13a instead of the IP address. Further, the printer name is stored in the maintenance printer memory 142f instead of the node name. Alternatively, it is allowable to use ID which can identify the printer, such as product ID and vendor ID assigned to the printer 50B4, instead of the printer name.

<Modified Embodiment in Relation to Entire Process>

In the above embodiments, in the entire process shown in FIG. 4, it is judged in S400 as to whether or not the status information is received. However, the following configuration is allowable. That is, the process of S400 is executed independently of the entire process. In this case, in a case that the CPU 11 judges that the status information is received, the entire process including S401 to S410 is started.

<Other Modified Embodiments>

The configuration, in which MAC address (Media Access Control Address) is stored in the printer memory 13a instead of the IP address, is also allowable.

Figure 5A:
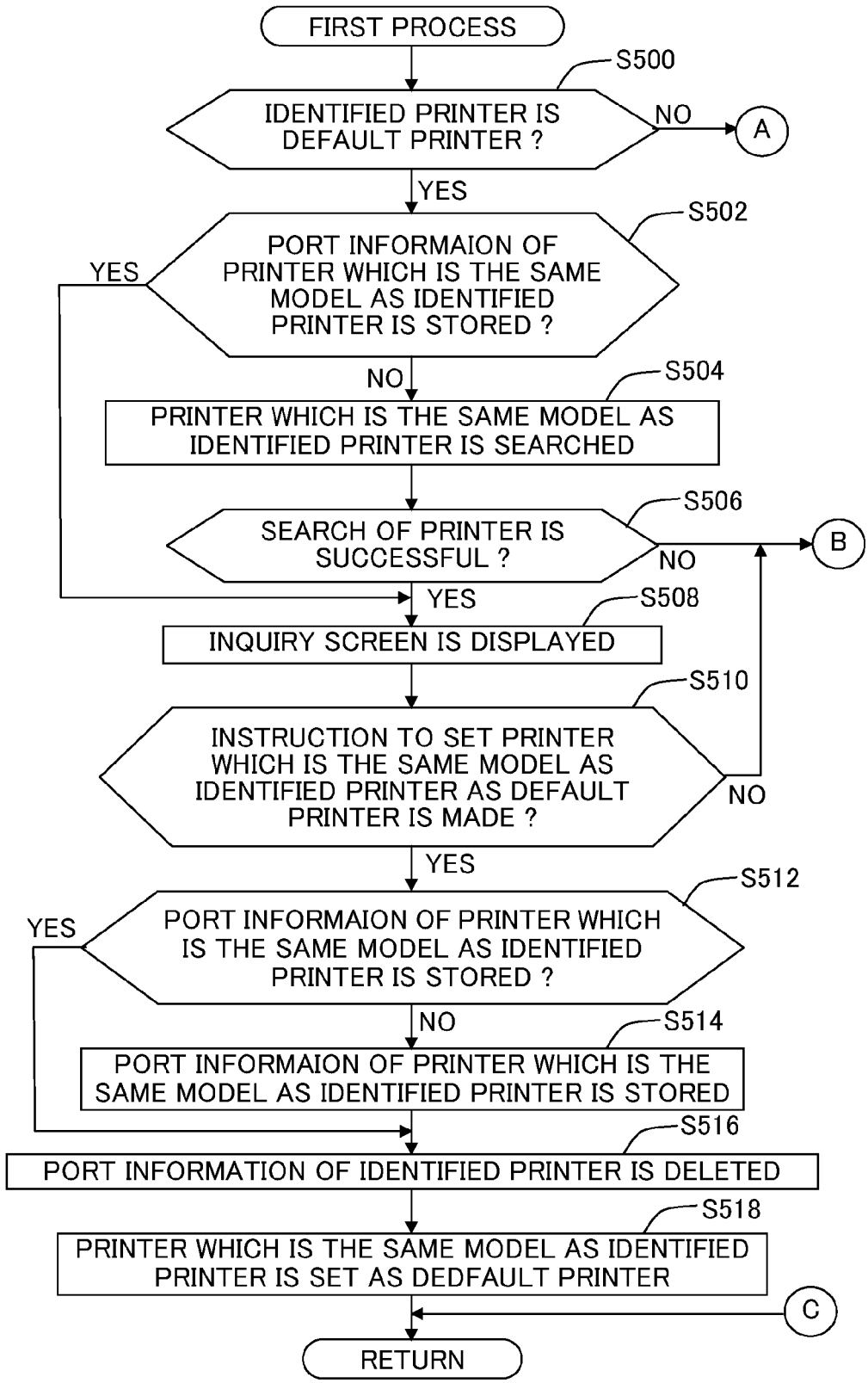
Figure 6A:
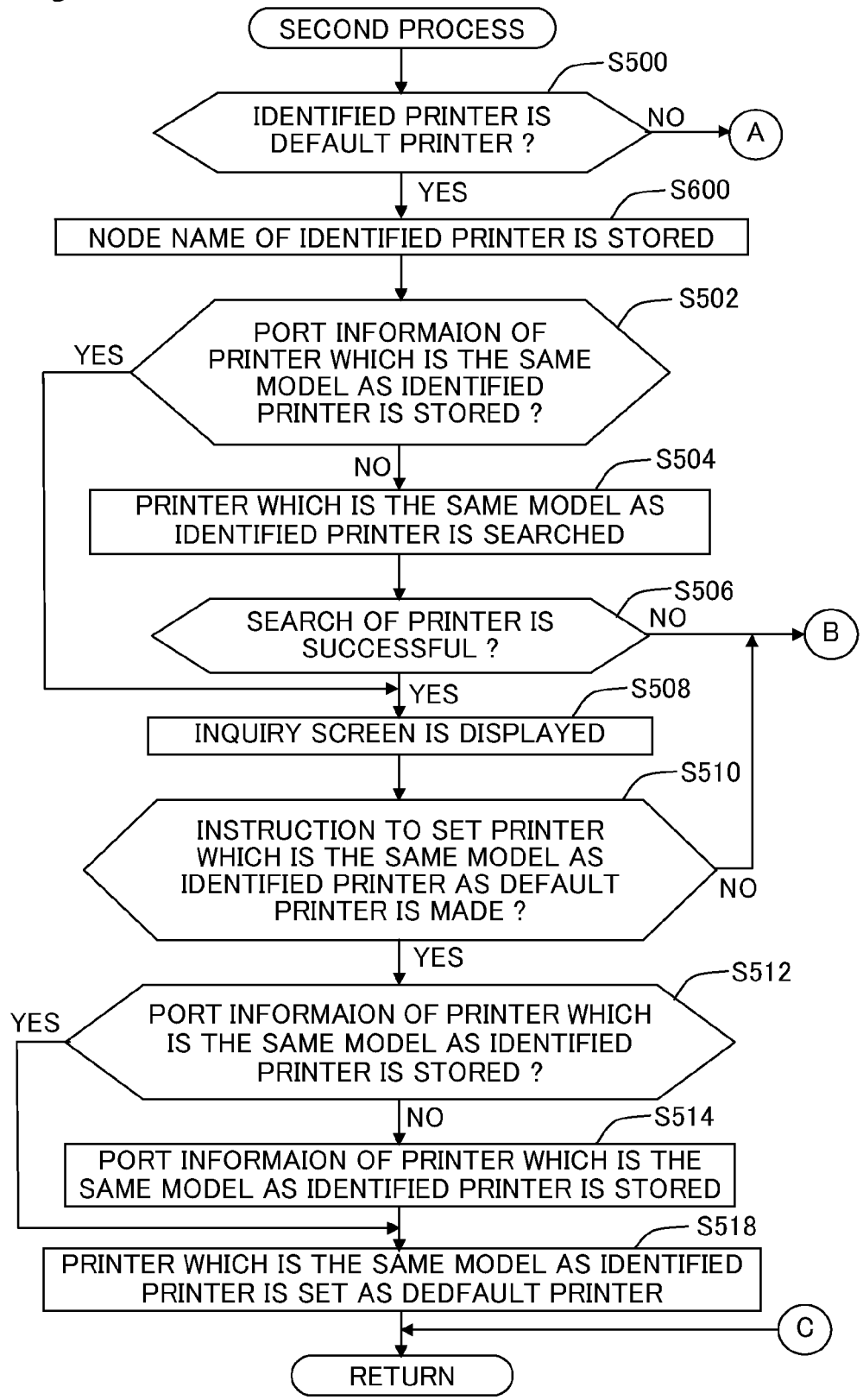
FIGS. 6A and 6B show a flowchart showing the second process executed by the PC according to the embodiment of the present teaching.
Figure 6B:
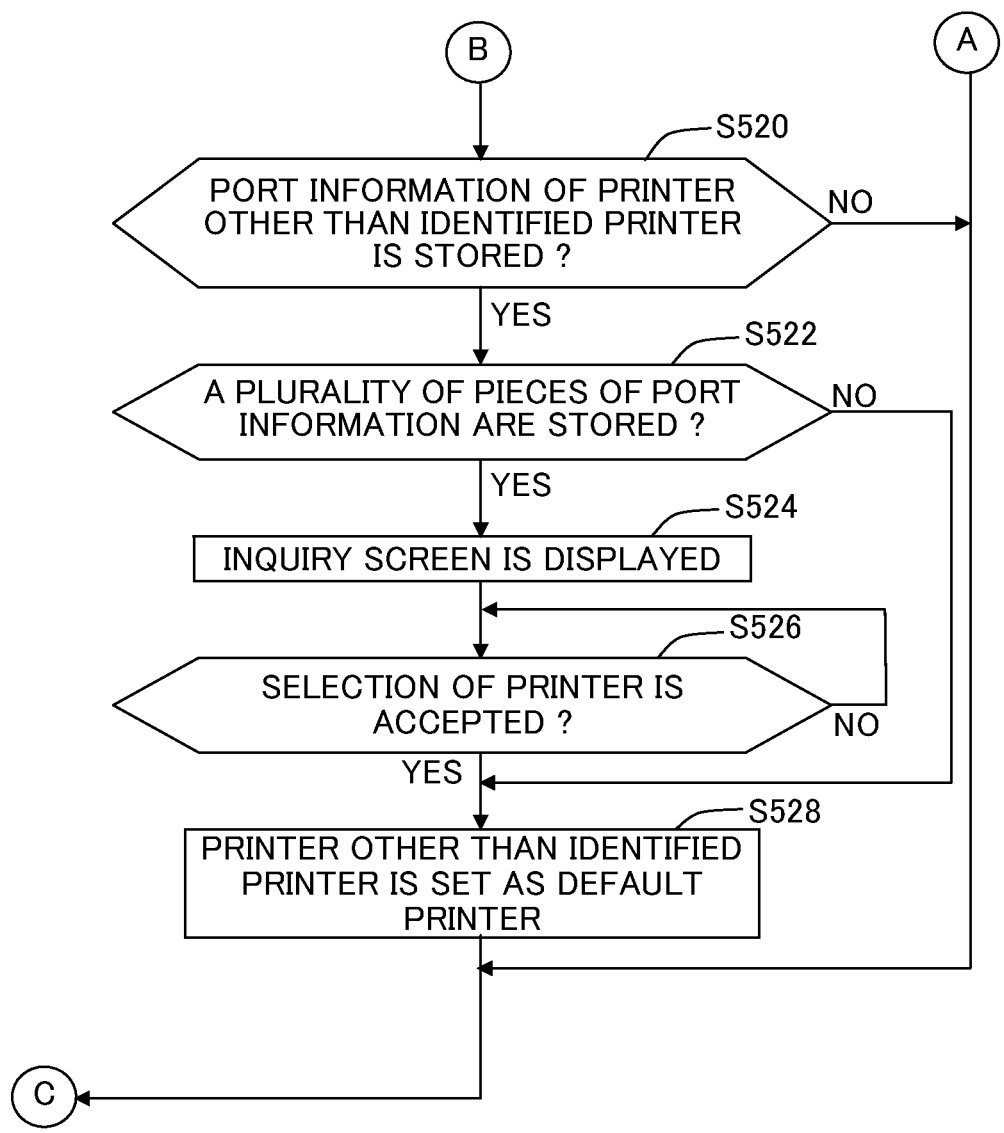

The processes shown in FIGS. 4 to 6 may be executed by the status monitor 142d not only in relation to the printer but also in relation to devices connected to the network, such as facsimile machines, network scanners, etc.

In S502, S504, S510, S512, S514, S518, and S532, the printer which is the same model as the identified printer may be replaced with a printer which uses the same printer driver as the identified printer. The reason thereof is considered that, even if the model of the printer is different from that of the identified printer, the printer which corresponds to the same printer driver as the identified printer has similar functions.

In the embodiment and the modified embodiments, the explanations are made with respect to the examples in which the present teaching is applied to the PC 10A as the information processing apparatus or the communication system as the information processing system. However, the present teaching can also be provided as a computer readable storage medium in which the information processing program to make the PC 10A as the information processing apparatus execute the processes described above is stored.

What is claimed is:

1. A non-transitory computer readable storage medium in which an information processing program is stored, the program being usable for an information processing apparatus which is configured to communicate with a plurality of devices, which includes a first storage section, in which a driver configured to operate the plurality of devices and a plurality of pieces of port information to communicate with the plurality of devices are stored, and which instructs a control objective device, among the plurality of devices, a piece of port information of which is stored in the first storage section, to execute a function of the control objective device, and the program making the information processing apparatus execute steps comprising:

a receiving step in which a piece of status information is received from the control objective device;

a first identifying step in which the control objective device is identified;

a second identifying step in which an alternative device which is operated by the driver to operate the control objective device is identified from among the plurality of devices;

a first storage step in which, in a case that a type of the status information is nonuse of the control objective device, a piece of port information of the alternative device is stored in the first storage section;

a third identifying step in which the type of the status information is identified;

a deletion step in which, in a case that it is identified in the third identifying step that the type of the status information is the nonuse of the control objective device, the port information of the control objective device is deleted from the first storage section, wherein the program makes the information processing apparatus further execute a first judgment step in which it is judged whether or not the control objective device is a default device, and in a case that it is judged in the first judgment step that the control objective device is the default device, the port information of the alternative device is stored in the first storage section in the first storage step, and in a case that it is judged in the first judgment step that the control objective device is not the default device, the port information of the alternative device is not stored in the first storage section in the first storage step, wherein the plurality of devices include a plurality of control objective devices, a plurality of pieces of port information of which are stored in the first storage section;

a fourth judgment step in which it is judged whether or not the alternative device has been successfully identified in the second identifying step;

an instruction acceptance step in which a selection instruction to select a second control objective device, which is other than a first control objective device identified in the first identifying step, from among the plurality of the control objective devices, is accepted; and a fourth setting step in which, in a case that it is judged in the first judgment step that the first control objective device is the default device, that it is identified in the third identifying step that the type of the status information is the nonuse or the temporary nonuse of the first control objective device, and that it is judged in the fourth judgment step that the alternative device has not been successfully identified, the second control objective device which is selected by the selection instruction accepted in the instruction acceptance step is set as the default device.

2. The storage medium according to claim 1, wherein the program makes the information processing apparatus further execute a first setting step in which the alternative device, the port information of which is stored in the first storage section in the first storage step, is set as the default device.

3. A non-transitory computer readable storage medium in which an information processing program is stored, the program being usable for an information processing apparatus which is configured to communicate with a plurality of devices, which includes a first storage section, in which a driver configured to operate the plurality of devices and a plurality of pieces of port information to communicate with the plurality of devices are stored, and which instructs a control objective device, among the plurality of devices, a piece of port information of which is stored in the first storage section, to execute a function of the control objective device, and the program making the information processing apparatus execute steps comprising:

a receiving step in which a piece of status information is received from the control objective device;

a first identifying step in which the control objective device is identified;

a second identifying step in which an alternative device which is operated by the driver to operate the control objective device is identified from among the plurality of devices;

a first storage step in which, in a case that a type of the status information is nonuse of the control objective device, a piece of port information of the alternative device is stored in the first storage section;

a third identifying step in which the type of the status information is identified;

a second judgment step in which, in a case that it is identified in the third identifying step that the type of the status information is a temporary nonuse of the control objective device, it is judged whether or not the control objective device is a default device;

a second storage step in which, in a case that it is judged in the second judgment step that the control objective device is the default device, the port information of the alternative device is stored in the first storage section; and a second setting step in which the alternative device, the port information of which is stored in the first storage section in the second storage step, is set as the default device.

4. The storage medium according to claim 3, wherein the information processing apparatus further includes a second storage section in which a piece of inherent information which is inherent in the control objective device is stored, and the information processing program makes the information processing apparatus further execute:

a third storage step in which, in a case that it is judged in the second judgment step that the control objective device is the default device, the inherent information of the control objective device is stored in the second storage section, and in a case that it is judged in the second judgment step that the control objective device is not the default device, the inherent information of the control objective device is not stored in the second storage section;

a third judgment step in which, in a case that it is identified in the third identifying step that the type of the status information is a comeback of the control objective device from the temporary nonuse, it is judged whether or not the inherent information of the control objective device is stored in the second storage section; and a third setting step in which, in a case that it is judged in the third judgment step that the inherent information is stored in the second storage section, the control objective device is set as the default device.

5. The storage medium according to claim 3, wherein the program makes the information processing apparatus further execute a fifth judgment step in which it is judged whether or not the port information of the alternative device is stored in the first storage section, and in a case that it is judged in the fifth judgment step that the port information of the alternative device is not stored in the first storage section, the port information of the alternative device is stored in the first storage section in one of the first and second storage steps, and in a case that it is judged in the fifth judgment step that the port information of the alternative device is stored in the first storage section, the port information of the alternative device is not stored in the first storage section in the first and second storage steps.

6. An information processing apparatus which is configured to communicate with a plurality of devices, the apparatus comprising:

a communication unit to communicate with the plurality of devices;

a storage section in which a driver to operate the plurality of devices and a plurality of pieces of port information to communicate with the plurality of devices are stored; and a controller which controls the communication unit and the storage section to instruct a control objective device, among the plurality of devices, a piece of port information of which is stored in the storage section, to execute a function of the control objective device, wherein the controller is configured to:

receive a piece of status information from the control objective device;

identify the control objective device;

identify an alternative device, which is operated by the driver to operate the control objective device, from among the plurality of devices;

store a piece of port information of the alternative device in the storage section, in a case that a type of the status information is nonuse of the control objective device;

identify the type of the status information;

delete the port information of the control objective device from the storage section, in a case that it is identified that the type of the status information is the nonuse of the control objective device;

judge whether or not the control objective device is a default device;

store the port information of the alternative device in the storage section in a case that it is judged that the control objective device is the default device, and not to store the port information of the alternative device in the storage section in a case that it is judged that the control objective device is not the default device, wherein the plurality of devices include a plurality of control objective devices, a plurality of pieces of port information of which are stored in the storage section;

judge whether or not the alternative device has been successfully identified;

accept a selection instruction in which a second control objective device, other than a first control objective device the status information of which is received, is selected from among the plurality of the control objective devices; and set the second control objective device which is selected by the selection instruction as the default device, in a case that it is judged that the first control objective device is the default device, that it is identified that the type of the status information is the nonuse or the temporary nonuse of the first control objective device, and that it is judged that the alternative device has not been successfully identified.

7. The information processing apparatus according to claim 6, wherein the controller is further configured to set the alternative device, the port information of which is stored in the storage section, as the default device.

8. An information processing apparatus which is configured to communicate with a plurality of devices, the apparatus comprising:

a communication unit to communicate with the plurality of devices;

a storage section in which a driver to operate the plurality of devices and a plurality of pieces of port information to communicate with the plurality of devices are stored; and a controller which controls the communication unit and the storage section to instruct a control objective device, among the plurality of devices, a piece of port information of which is stored in the storage section, to execute a function of the control objective device, wherein the controller is configured to:
  receive a piece of status information from the control objective device;
  identify the control objective device;
  identify an alternative device, which is operated by the driver to operate the control objective device, from among the plurality of devices;
  store a piece of port information of the alternative device in the storage section, in a case that a type of the status information is nonuse of the control objective device;
  identify the type of the status information;
  judge whether or not the control objective device is the default device, in a case that it is identified that the type of the status information is a temporary nonuse of the control objective device;
  store the port information of the alternative device in the storage section, in a case that it is judged that the control objective device is the default device; and
  set the alternative device, the port information of which is stored in the storage section, as the default device.

9. The information processing apparatus according to claim 8,
wherein the controller is further configured to:
  store an inherent information which is inherent in the control objective device in the storage section in the case that it is judged that the control objective device is the default device, and not to store the inherent information which is inherent in the control objective device in the storage section in a case that it is judged that the control objective device is not the default device;
  judge whether or not the inherent information of the control objective device is stored in the storage section, in a case that it is identified that the type of the status information is a comeback of the control objective device from the temporary nonuse; and
  set the control objective device as the default device, in a case that it is judged that the inherent information is stored in the storage section.

10. The information processing apparatus according to claim 8,
wherein the controller is further configured to:
  judge whether or not the port information of the alternative device is stored in the storage section; and
  store the port information of the alternative device in the storage section in a case that it is judged that the port information of the alternative device is not stored in the storage section, and not to store the port information of the alternative device in the storage section in a case that it is judged that the port information of the alternative device is stored in the storage section.

11. An information processing system which includes a plurality of devices and an information processing apparatus which is configured to communicate with the plurality of devices,
wherein each of the devices includes a transmission section to transmit, to the information processing apparatus, a piece of nonuse information, which indicates nonuse of a device transmitting the nonuse information, the information processing apparatus includes:
  a communication unit to communicate with the plurality of devices;
  a storage section in which a driver to operate the plurality of devices and a plurality of pieces of port information to communicate with the plurality of devices are stored; and
  a controller which controls the communication unit and the storage section to instruct a control objective device, among the plurality of devices, a piece of port information of which is stored in the storage section, to execute a function of the control objective device, and the controller is configured to:
  identify the control objective device;
  identify an alternative device, which is operated by the driver to operate the control objective device, from among the plurality of devices;
  store a piece of port information of the alternative device in the storage section, in a case that the controller receives the nonuse information from the control objective device;
  identify the type of the status information;
  delete the port information of the control objective device from the storage section, in a case that it is identified that the type of the status information is the nonuse of the control objective device;
  judge whether or not the control objective device is a default device;
  store the port information of the alternative device in the storage section in a case that it is judged that the control objective device is the default device, and not to store the port information of the alternative device in the storage section in a case that it is judged that the control objective device is not the default device, wherein the plurality of devices include a plurality of control objective devices, a plurality of pieces of port information of which are stored in the storage section;
  judge whether or not the alternative device has been successfully identified;
  accept a selection instruction in which a second control objective device, other than a first control objective device the status information of which is received, is selected from among the plurality of the control objective devices; and
  set the second control objective device which is selected by the selection instruction as the default device, in a case that it is judged that the first control objective device is the default device, that it is identified that the type of the status information is the nonuse or the temporary nonuse of the first control objective device, and that it is judged that the alternative device has not been successfully identified.

* * * * *